W. L. MORRIS.
RECORDING MECHANISM.
APPLICATION FILED JAN. 20, 1904.

960,032.

Patented May 31, 1910.

WITNESSES:
D. G. Davies
G. W. Saywell

INVENTOR:
Wm L. Morris
by his attorney
J. D. Fay

UNITED STATES PATENT OFFICE.

WILLIAM L. MORRIS, OF CHICAGO, ILLINOIS.

RECORDING MECHANISM.

960,032.  Specification of Letters Patent.  Patented May 31, 1910.

Application filed January 20, 1904. Serial No. 189,790.

*To all whom it may concern:*

Be it known that I, WILLIAM L. MORRIS, a citizen of the United States, resident of Chicago, county of Cook, and State of Illinois, have invented a new and useful Improvement in Recording Mechanisms, of which the following is a specification, the principle of the invention being herein explained and the best mode in which I have contemplated applying that principle, so as to distinguish it from other inventions.

My invention relates to recording mechanisms, and particularly to such mechanisms as are utilized to record the number of rotations, reciprocations, or other consecutive movements of a device upon a moving chart.

Said invention consists of means hereinafter fully described and specifically set forth in the claims.

The annexed drawing and the following description set forth in detail certain mechanism embodying the invention, such disclosed means constituting but one of various mechanical forms in which the principle of the invention may be used.

Figure 1:
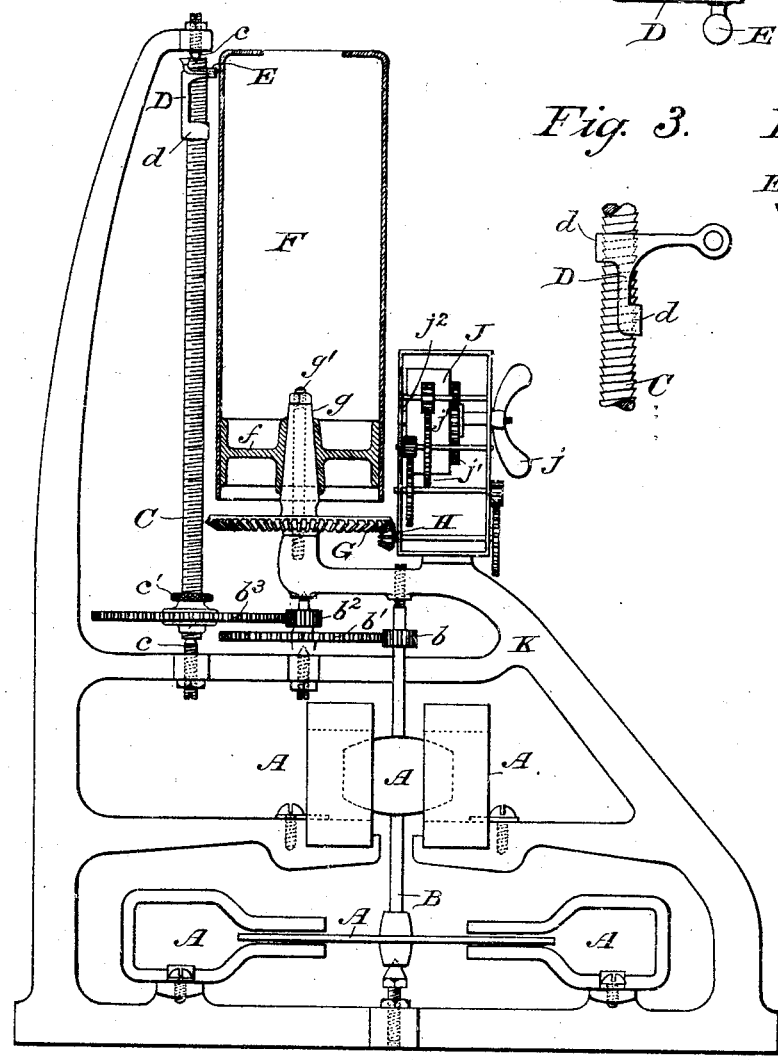
Figure 2:
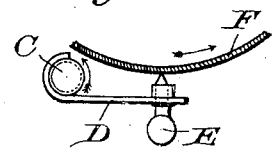
Figures 3, 4:
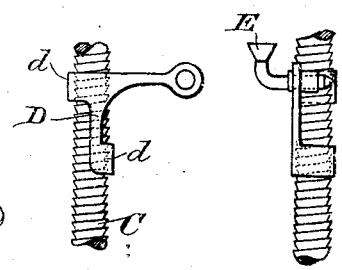

In said annexed drawing: Figure 1 represents a side elevation of the device embodying my invention, with parts in section, as applied to an electrical meter; Figs. 2, 3 and 4 are views, upon an enlarged scale, of the recording pen and showing the mechanism to which the latter is attached.

My invention embodies means for recording consecutive movements upon a chart surface which is moved away from the recording line for the purpose of showing the number of movements during the duration of the chart movement, or for any desired interval of this movement.

The device is applicable to gas-meters, water-meters, watt-meters, and other mechanism having a rotative or other movement, by means of the mechanism herein shown. I have shown my invention as applied to a recording watt-meter, in which it is substituted for the dials that are ordinarily used to register the number of rotations or movements. The recording watt-meter, as is well understood, is provided with a movable coil which rotates, the amount of energy expended in the circuit being measured by the rotation of such movable coil.

By means of my invention no details of the measurement are entered into, but there is merely recorded that which has been determined to be the amount of energy necessary to be expended to produce a given amount of rotation of the meter's mechanism, so that what my chart virtually records is rotations, or cycles of movement, *i. e.*, it counts the cycles and records the number and time of such cycles.

Considerable difficulty attends the use of chart recording mechanism in the manner contemplated for the obvious reason that instruments such as watt-meters and the like are very delicately calibrated and even the slightest variation in the resistance offered by the recording mechanism, proper, to the driving mechanism whose cycles are counted will render the record inaccurate. A prime object in my invention, hence, is to provide a construction in which the ideal condition of a constant resistance is most nearly realized. It is at the same time sought to render this resistance as low as possible by eliminating all unnecessary friction.

In the mechanism illustrated A A represent those elements of the watt-meter which cause rotation of a shaft B by means of the flow of current through the meter, that flow necessary to cause one revolution being a known quantity, for instance, one watt. Secured to the shaft B is a pinion $b$ which engages with a gear $b'$ and thus drives a pinion $b^2$ which engages with a gear $b^3$ mounted on a threaded shaft C in a manner fully set forth later. This threaded shaft C is pivoted at its ends upon the pointed screws $c$. Engaging with the threaded shaft C by means of two half nuts $d$ is an arm D which carries a pen E, shown on a larger scale in Figs. 2, 3 and 4. The half nuts $d$ are held in engagement with the shaft C by means of the weight of the arm D and the pen E, and are readily removable from the shaft by raising the outer end of the arm D and disengaging the half nuts from the screw.

F represents a cylinder which carries a chart and is attached to a hub piece $f$. The chart used may be any of many well-known forms, and upon the mechanism illustrated in the drawing I am accustomed to use one that has lines running horizontally across the paper to designate the watts, and lines running vertically to designate the time, and then the angle of the irregular line traced across the chart by the pen E will denote the "load angle", and the quantity of flow can be read during any interval of time during which the chart was in operation. The hub $f$ has a tapered cylindrical hole which fits over the hub $g$ of the bevel gear G which rotates on the stationary spindle $g'$. The cylinder is thus enabled to be readily removed in order to change the charts; also it can be rotated independently of the gears J, hereinafter described, so as to enable the setting of a new chart at any predetermined position. The gear G is driven by the bevel pinion H which is rotated by the clock J a fixed number of revolutions every twenty-four hours, I finding it preferable in the use of my invention illustrated in the drawing to construct the cylinder F so that it makes one revolution every day. The clock J is wound by the key $j$, and comprises the gears $j'$ and the main spring $j^2$ with the escapement behind the same. The clock, cylinder F, screw-shaft C, meter parts A and shaft B are all carried by the main frame K. The extreme lower end of screw-shaft C is not threaded but terminates in a shoulder or collar upon which gear $C^3$ rests. This gear is normally rotatively secured to the shaft by a lock-nut $c'$ mounted on the lower threaded portion of the latter and adapted to be drawn up against the gear in question. By simply loosening this nut, however, it is evident that the shaft may be rotated independently of such gear and connected driving mechanism. This construction facilitates the adjustment of the pen vertically since it can be thus easily and quickly brought to any predetermined position on the chart to accord exactly with the time of starting the record, when, as in the case in hand, such divisions represent time.

In the operation of my device, the current flow causes the shaft B to revolve, and the motion is communicated to the screw-shaft C by means of the gears $b$, $b'$, $b^2$, and $b^3$, so that the pen E is caused to be lowered according to the number of revolutions of the shaft B. If, for instance, one inch upon the chart is to register one thousand watts and the shaft B makes one revolution for each watt, then such a screw and gear ratio must be used as will enable the shaft B to revolve one thousand times while the screw shaft C is revolving as many times as it has threads per inch. If the latter has twenty threads to the inch, the ratio of the revolutions of shaft B to shaft C will be fifty to one. It will thus be seen that the number of revolutions of the shaft C are hence dependent directly upon the number of revolutions of the shaft B, and the revolutions of the latter dependent upon the quantity of flow; also that the amount of lowering of the pen E is directly dependent upon the quantity of flow. It being assumed that the cylinder F is caused by the clock gears $j'$ to rotate once in twenty-four hours, the chart line may be started at any desired position, and will be finished completely around the cylinder in a day. By means of the form of chart described, or any other suitable form, the quantity of flow can thus be determined for the whole time during which the cylinder has been rotated or for interval of the whole period. The chart can then be replaced by another, and the old one filed away for reference. The screw-shaft C is caused to rotate in such a direction that the friction of the half nuts $d$, Figs. 3 and 4, causes the pen E to remain against the chart. The direction of travel of the cylinder F is in a direction different to that of shaft C to assist in keeping the upper half nut of the arm D in engagement with the screw C. This method of mounting the marking device has a further important advantage of permitting such device to accommodate itself to the irregularities that always exist in a chart affixed to a drum and that seriously interfere with the working of the recording mechanism where the marker is held in a fixed position or even spring-supported.

From the foregoing description of my newly invented form of recording mechanism as applied to a watt-meter, it will be seen that it presents several distinguishing features when compared with recording instruments heretofore devised. As has been stated it is designed to replace the system of dials and pointers ordinarily employed in meters which indicate at the time of reading the total amount of work or quantity of gas etc. that has been used up to that time; hence it is not to be confused with recording devices designed simply to record the fluctuations or variations in the quantity being measured. The advantages that my device possesses over the dial system are obvious, it not only indicates the amount or quantity at the particular moment of reading but makes in permanent form a continuous record of such amounts for successive moments. At the same time, as has been shown before, it indicates by the angle of the recording line on the chart the rate of flow where quantity used, or the "load" where energy supplied, is being measured.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention:—

1. In recording mechanism or the like, the combination with two vertically-disposed rotatable members, of a marking device traveling upon one of said members and adapted to mark upon the other thereof, said marker being held against such second member by frictional contact with said first member.

2. In recording mechanism or the like, the combination with a record-receiving member, of a rotatable member adjacent thereto, and a marking device movable along said rotatable member and held against said record-receiving member by frictional contact with said rotatable member only, whereby said marking device is enabled to accommodate itself to inequalities in the surface of said record-receiving member and a uniform resistance is offered to the movement of said rotatable member at all times.

3. In recording mechanism or the like, the combination with a record-receiving drum rotating at a uniform rate of speed, of a threaded shaft parallel therewith, and a marking device mounted upon said shaft and held against said drum by frictional contact with said shaft only, whereby said marking device is adapted to oscillate about said shaft to accommodate itself to inequalities in the surface of said record-receiving drum and a uniform resistance is offered to the movement of said shaft at all times.

4. The combination with a meter calibrated to overcome a constant resistance, of recording mechanism therefor, such mechanism including a record-receiving member, a rotatable member adjacent thereto, and a marking device movable along said rotatable member and held against said record-receiving member by frictional contact with said rotatable member only, whereby said marking device is enabled to accommodate itself to inequalities in the surface of said record-receiving member and a uniform resistance is offered to the movement of said rotatable member at all times.

5. The combination with a meter calibrated to overcome a constant resistance, of recording mechanism therefor, such mechanism comprising a record-receiving drum, rotating at a uniform rate of speed, a threaded shaft parallel therewith, and a marking device mounted upon said shaft and held against said drum by frictional contact with said shaft only, whereby said marking device is adapted to oscillate about said shaft to accommodate itself to inequalities in the surface of said record-receiving drum and a uniform resistance is offered to the movement of said rotatable member at all times.

6. In recording mechanism or the like, the combination with two vertically-disposed rotatable members, a marking device traveling upon one of said members and adapted to mark upon the other thereof, and separate driving means for rotating said members, said means being respectively connected to rotate said members in opposite directions whereby said recording device is held against such second member by frictional contact with said first member.

7. In recording mechanism, the combination with the mechanism whose cycles are to be recorded, of a vertical, threaded shaft, rotating in unison with the cycles of said mechanism, a drum rotating at a uniform rate of speed and bearing a chart, and a stylus mounted upon said threaded shaft and contacting with said chart, being kept in such contacting position by friction with said rotating shaft.

8. In recording mechanism, the combination with the mechanism whose movements are to be recorded, of a rotatable member, a second independently rotatable member, means connecting said mechanism to said first-named member and adapted to cause the latter to rotate continuously in one direction at a variable rate of speed, recording means embodying an arm traveling upon and with such variably moving member and carrying a pen bearing upon said second member, and means for producing a uniform rotation of said second member in a direction different to the direction of rotation of said first member, whereby said recording means are held in intimate engagement with said two members.

9. In recording mechanism, the combination with a vertically-disposed threaded shaft, of a marking device operated thereby, said marking device including a sectional nut supported by said shaft and held in contact therewith by gravity alone.

10. In recording mechanism or the like, the combination with a threaded shaft, of a marking device operated thereby, said marking device including two substantially oppositely-disposed, axially separated sectional nuts adapted to engage said shaft.

11. In recording mechanism or the like, the combination with a vertical threaded shaft, of a marking device operated thereby, such marking device including two substantially oppositely-disposed, axially-separated sectional nuts, and a stylus serving to hold said nuts in engagement with said shaft.

12. In recording mechanism, the combination with the mechanism whose cycles are to be recorded, of a vertical shaft provided with a screw thread and rotating in unison with the cycles of said mechanism, and a marking device operated by said shaft, said marking device including two half nuts longitudinally spaced, but engaging opposite sides of said vertical shaft, whereby said device is removably held upon the latter.

13. In recording mechanism, the combination of a rotary record-receiving member, a threaded shaft adjacent thereto, a marking device threaded upon said shaft and adapted to mark upon said member, driving means for rotating said shaft, and means for releasing said shaft from said driving means, whereby said shaft may be rotated independently of such driving means for setting said marking device.

14. In recording mechanism, the combination of a rotary record-receiving member, a threaded shaft adjacent thereto, a marking device threaded upon said shaft and adapted to mark upon said member, driving means for rotating said shaft, such means including a gear loosely mounted thereon and a lock nut adapted to lock the same thereto when drawn tight and to permit rotation thereof independently of said driving means when loosened.

15. In recording mechanism, the combination with the mechanism whose movements are to be recorded, of a rotatable member, a second independent rotatable member, gearing connecting said mechanism to said first-named member and adapted to cause the latter to rotate continuously in one direction at a variable rate of speed, recording means embodying an arm traveling upon and with such variably moving member and carrying a pen bearing upon said second member, clock-works connected to said second member to produce a uniform rotation of the same, said latter rotation being in a direction different to that of the direction of rotation of said first member, whereby said recording means are held to intimate engagement with said two members, a spindle upon which said second member is loosely mounted, whereby it can be independently rotated and set to begin its uniform rotation at a predetermined position, and means for independently turning said first member to enable said pen to be set and started at a predetermined position upon said second member.

Signed by me, this 15th day of January, 1904.

WILLIAM L. MORRIS.

Attested by—
Wm. H. Yagle,
C. C. Cunningham.